Jan. 1, 1935.   R. ZASTOUPIL   1,986,177
ROLLER PLANET GEAR
Filed Feb. 25, 1933
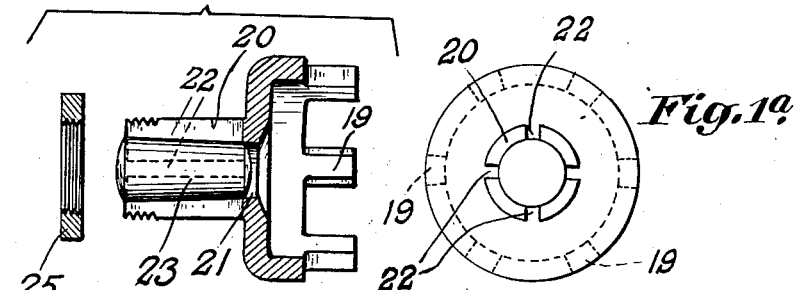
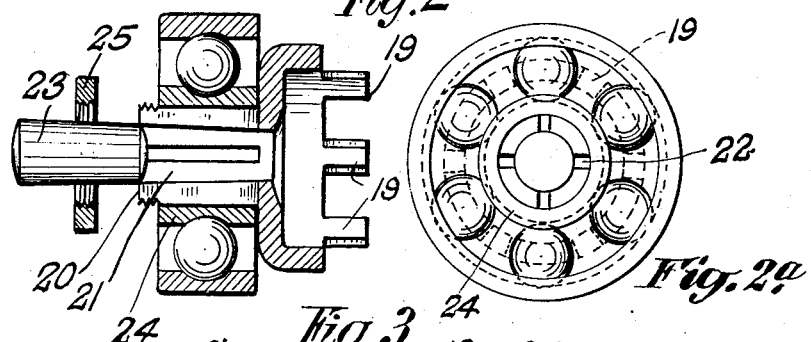
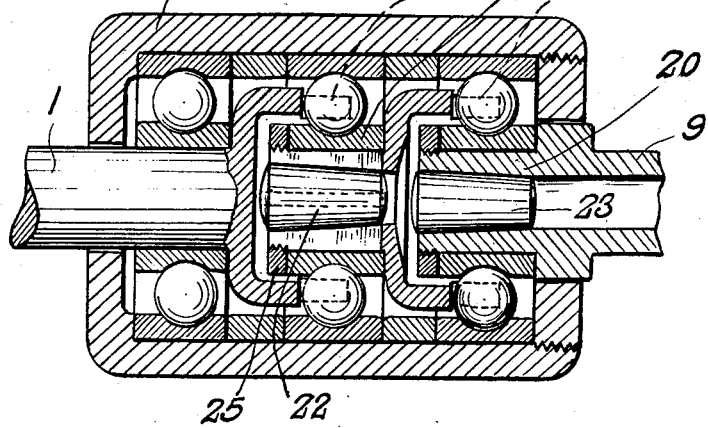
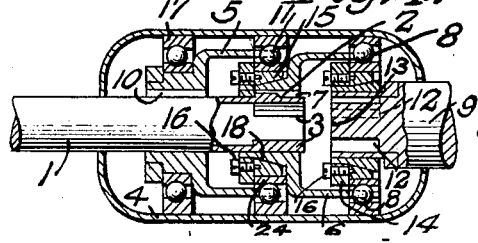
INVENTOR
R. ZASTOUPIL
BY
ATTY.

Patented Jan. 1, 1935

1,986,177

UNITED STATES PATENT OFFICE 1,986,177

ROLLER PLANET GEAR

Robert Zastoupil, Vienna, Austria

Application February 25, 1933, Serial No. 658,570
In Austria February 26, 1932

7 Claims. (Cl. 74—302)

The invention relates to roller planet gears of the type in which roller members disposed between two running surfaces co-operate with a driving cage, and in which the transmission of the friction-drive pressure to the rolling elements is effected by the spreading of the inner rotor ring.

The invention has for its object to improve planet gears of this type by making it possible to reduce the required friction-drive pressure, and also by making it possible to utilize normal (purchaseable) roller bearings for the manufacturing of the gears. In accordance with the invention the driving cage is connected, for this purpose, to an extension portion which is split or slotted for the purpose of transmitting the friction-drive pressure to the preceding series of roller elements.

Both this extension portion, which preferably consists of a slotted sleeve, and also the rotor ring which is drifted on to this bush, and which is split or slotted for expansion in a known manner, are adapted to be spread by means of a pressing or regulating member, for example a conical bolt (mandrel) or the like, pressure being thereby exerted upon the rollers.

The invention is illustrated, by way of example, in the figures of the drawing, Fig. 1 showing the driving member with a plug disposed in its extension. Fig. 1a is an end elevation of Fig. 1. Fig. 2 the mounting of the driving member in the longitudinal section. Fig. 2a is an end view of Fig. 2. Fig. 3 shows a complete gear, in section, embodying two driving dogs in accordance with the invention. Fig. 4 shows the complete layout of a change-speed gear in accordance with the present invention, in longitudinal section, and Fig. 5 the shape of the end portion of the driving shaft appropriate to this gear, in transverse section.

If it is desired, for example, to convert an already used ball- or roller-bearing into a gear in accordance with the invention, the ball or roller cage is removed, and an engaging piece 19 inserted between each two balls or rollers. This engaging piece 19 can take the form of a tooth on a member resembling, for example, a normal claw-cage. If the ball-bearing concerned has, for example, six balls, a tooth is positioned between each two balls (Fig. 2), i. e. six teeth are employed. Otherwise the number of teeth will depend upon the construction of the bearing used in any particular instance. As above mentioned, the claw-cage can be fitted with a plug 23 (Fig. 2), for which purpose it is provided with a cylindrical extension 20 having a conical bore 21 to receive the plug. This portion 20 is provided with slots 22. The plug 23 serves the purpose of spreading the cylindrical portion 20, the pressure being obtained by virtue of the fact that the tapered plug is made of greater thickness than the corresponding internal diameter of the extension 20.

The teeth 19 are inserted between each ball and the next, these balls being arranged in the same manner as the balls shown surrounding the portion 20 on the left in Fig. 2, i. e. so as to run between an outer and an inner ring 24. The slipping of the inner ring 24 on the portion 20 of the driving dog is prevented by means of a collar nut 25 screwed onto the end of this portion 20. As the figures show, the collar nut 25 consists of a ring which is naturally spread. The ring 24 is also spread, so that it can be distended outwardly by the pressure exerted thereon.

The mode of operation of the device can best be understood with reference to Fig. 3, in which the device is shown employed in duplicate. It is assumed that the drive is to be transmitted from the shaft 1. For this purpose this shaft 1 is provided at its end with a driving dog of the type described. This dog 19 when rotated will drive the balls in front of it. The balls are arranged—as described above—between the inner ring 24 and an outer ring. The outer rings comprised within the casing 4 are pressed together by an end nut which closes the casing, and are thus positively united. Since the plug exerts outwardly directed pressure upon the inner ring 24, which is rendered capable of being spread, e. g. by being slotted, the balls will run on this inner ring, but will carry the outer ring along with them. The outer ring takes the casing 4 along with it and rotates it. Transmission of movement to the shaft 9 does not take place, i. e. this is the idle or neutral setting of the gear.

If the shaft 9 is to be driven, and that at a higher speed than the shaft 1, the casing 4 must be arrested i. e. prevented from rotating, by any suitable means. In this case the outer rotor ring is held fast by the casing, and the balls pressed from the inside against the outer ring will roll along this outer running surface, and will compel the inner ring 24 to rotate. Since the transmission of movement from the shaft 1 is effected through the intermediary of the balls, the speed of rotation of the ring 24 is increased relatively to that of the shaft 1. Now since, in the example shown in Fig. 3, the ring 24 is likewise attached to a claw-cage, this latter also rotates at a higher speed, and transmits its movement to a second series of balls, which is connected in parallel thereto, and which transmits to the shaft 9 connected therewith a speed of rotation which is still further increased relatively to the speed of the driving shaft. In accordance with the described principle it will clearly be possible to provide as many such stages, each consisting of a ball-bearing and a driving dog, as are necessary to obtain the desired transmission ratio. To the shaft 9 there is attached not a driving dog but a member consisting of the extension portion 20 and the plug 23.

As will be clear from Figs. 4 and 5, the described gear can also be arranged to constitute a change-speed gear unit, and that by arranging for the driving shaft 1 to be horizontally slidable. The end portion of this shaft is hollow and of the cross-sectional shape shown in Fig. 5. This end portion of the driving shaft is provided with key projections 2 on its outer surface and with similar key projections 3 on its inner surface. If desired, the shaft proper may be non-slidable and be fitted with a separate sliding sleeve having an end portion of the cross-sectional shape shown in Fig. 5. The purpose of this shape is the following:—

The individual engaging pieces 5, 6 disposed in the casing 4 can be driven as required by the shaft 1 by virtue of the arrangement that the keys 2 on the shaft 1 are thrust either into the corresponding grooves in the engaging piece 5 or into similar grooves in the engaging piece 6. With the position of the parts shown in Fig. 4 the engaging piece 6 is driven, since the keys 2 are in the grooves 7. In this case, therefore, the engaging piece 6 will drive the ball race 8 and will rotate the shaft 9. If it is desired to change over to a higher gear ratio the shaft 1 is moved to the left into the grooves 10 in the engaging piece 5. This engaging piece 5 will then drive the ball race 11, so that the ball race 8 is now rotated at a higher speed than if the shaft 1 were caused to transmit its rotation directly to the engaging member 6.

If it be desired to establish a simple and direct coupling or interengagement of the shafts 1 and 9, the shaft 1 is moved to the right as far as is necessary to bring the keys 3 into engagement with the grooves 12 in the end 13 of the shaft 9. If, on the other hand, the shaft 1 be required to run idle it is moved into a position in which there is no engagement either between the keys 2 and the grooves in the engaging member nor between the keys 3 and the grooves 12.

In accordance with the invention, and as above described, the movement is transmitted to the inner rings 24 by the driven balls only when these rings are outwardly sprung. The provision of a spreading plug would however be impossible in the case of the above-described change-speed gear. The spreading of the distendable or split running ring 24 is therefore effected in this case, in accordance with the invention, in a special manner, the arrangement being such that there is associated, at one or more points, with the tapered extension 18 of the engaging member a tapered wedge-piece 15 which is held in position beneath the ring or rings 24 by means of screws, bolts, or the like 16 mounted in an annular member 14. By the screwing inwards of these screws 16 the wedge-piece is thrust towards the right and thereby caused to spread the ring. The tension can be regulated at will. The first engaging member 5 can run in an ordinary ball bearing 17. The number of the engaging members and ball races employed is unlimited and will be determined by the particular requirements in any instance.

I claim:

1. A roller planet gear including a cage formed to drive a series of roller elements, said cage having an integral extension longitudinally slotted for expansion, and means for expanding the extension to transmit the friction drive pressure to another series of roller elements rolling around said extension.

2. A roller planet gear according to claim 1, wherein the extension is in the form of a cylindrical bush having longitudinal slots, with the interior of the bush substantially conical.

3. A construction according to claim 1, wherein the extension is in the form of a cylindrical bush formed with slots, with the interior space of the bush substantially conical, together with the provision of a regulating or pressing member to be fitted within said bush.

4. A construction according to claim 1, wherein the extension is in the form of a bush having a conical bore, together with the provision of a regulating or pressing member in the form of a taper element corresponding to the taper of the bore.

5. A construction according to claim 1, wherein between the rollers and square extension of the cage there is provided a rotor ring longitudinally slit to permit expansion.

6. A roller planet gear consisting of a driving element and a driven element and including a plurality of cages, roller elements to be driven by said cages, means integral with the cages for transmitting the friction drive pressure from one roller element to the preceding roller element, the driven member being integrally provided with a cage to co-operate with the adjacent roller elements.

7. A roller planet gear including a cage formed to drive a series of roller elements, said cage having an integral extension longitudinally slotted for expansion, and means for expanding the extension to transmit the friction drive pressure to another series of roller elements rolling around said extension, said extension being in the form of a cylindrical bush having longitudinal slots, with the interior of the bush substantially conical, and wherein the individual engaging members are capable of being individually driven from a driving element.

ROBERT ZASTOUPIL.